US009865093B1

(12) United States Patent
Mullins

(10) Patent No.: US 9,865,093 B1
(45) Date of Patent: Jan. 9, 2018

(54) CONTEXTUAL AUGMENTED REALITY DEVICES COLLABORATION

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/199,570

(22) Filed: Jun. 30, 2016

(51) Int. Cl.
| | |
|---|---|
| *G09G 5/00* | (2006.01) |
| *G06T 19/00* | (2011.01) |
| *G06F 3/14* | (2006.01) |
| *G06T 19/20* | (2011.01) |
| *G06F 3/01* | (2006.01) |
| *G02B 27/01* | (2006.01) |

(52) U.S. Cl.
CPC ........ *G06T 19/006* (2013.01); *G02B 27/0172* (2013.01); *G06F 3/012* (2013.01); *G06F 3/1423* (2013.01); *G06F 3/1454* (2013.01); *G06T 19/20* (2013.01); *G02B 2027/014* (2013.01); *G06T 2219/024* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10

See application file for complete search history.

(56) References Cited

U.S. PATENT DOCUMENTS

| | | | | |
|---|---|---|---|---|
| 2014/0354685 | A1* | 12/2014 | Lazarow | G02B 27/0172 345/633 |
| 2015/0089452 | A1* | 3/2015 | Dorninger | G06Q 10/101 715/848 |
| 2015/0326625 | A1* | 11/2015 | Rosenberg | H04L 67/42 715/753 |
| 2016/0044073 | A1* | 2/2016 | Rosenberg | H04L 65/4038 715/753 |

* cited by examiner

*Primary Examiner* — Todd Buttram
(74) *Attorney, Agent, or Firm* — Schwegman Lundberg & Woessner, P.A.

(57) ABSTRACT

A first display device determines a first device configuration of the first display device and a first context of a first AR application operating on the first display device. The first display device connects to a second display device and determines a second device configuration of the second display device and a second context of a second AR application operating on the second display device. The first display device generates a first collaboration configuration for the display device and a second collaboration configuration for the second display device. The first and second collaborations are based on the first device configuration, the first context, the second device configuration, and the second context. The second display device modifies an operation of the second AR application based on the second collaboration configuration. The first display device modifies an operation of the first AR application based on the first collaboration configuration.

20 Claims, 11 Drawing Sheets

CONNECTED DEVICE CONFIGURATION MODULE 406

PROFILE EXTRACTION MODULE 604

FIG. 6

CONTEXTUAL AUGMENTED REALITY DEVICES COLLABORATION

TECHNICAL FIELD

The subject matter disclosed herein generally relates to an augmented reality device. Specifically, the present disclosure addresses systems and methods for delivery of context-based content among augmented reality systems.

BACKGROUND

An augmented reality (AR) device can be used to generate and display data in addition to an image captured with the AR device. For example, AR provides a live, direct, or indirect view of a physical, real-world environment whose elements are augmented by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

When multiple AR devices are interconnected and used by multiple users, the content generated in one AR device may be replicated in other AR devices regardless of the unique configurations of each AR devices. For example, the rendering of a virtual content or the process of a particular task may be redundantly performed in each AR device causing inefficiencies in the network of connected AR devices.

BRIEF DESCRIPTION OF THE DRAWINGS

Some embodiments are illustrated by way of example and not limitation in the figures of the accompanying drawings.

FIG. 6 is a block diagram illustrating an example embodiment of a connected device configuration module.

DETAILED DESCRIPTION

Figure 1:
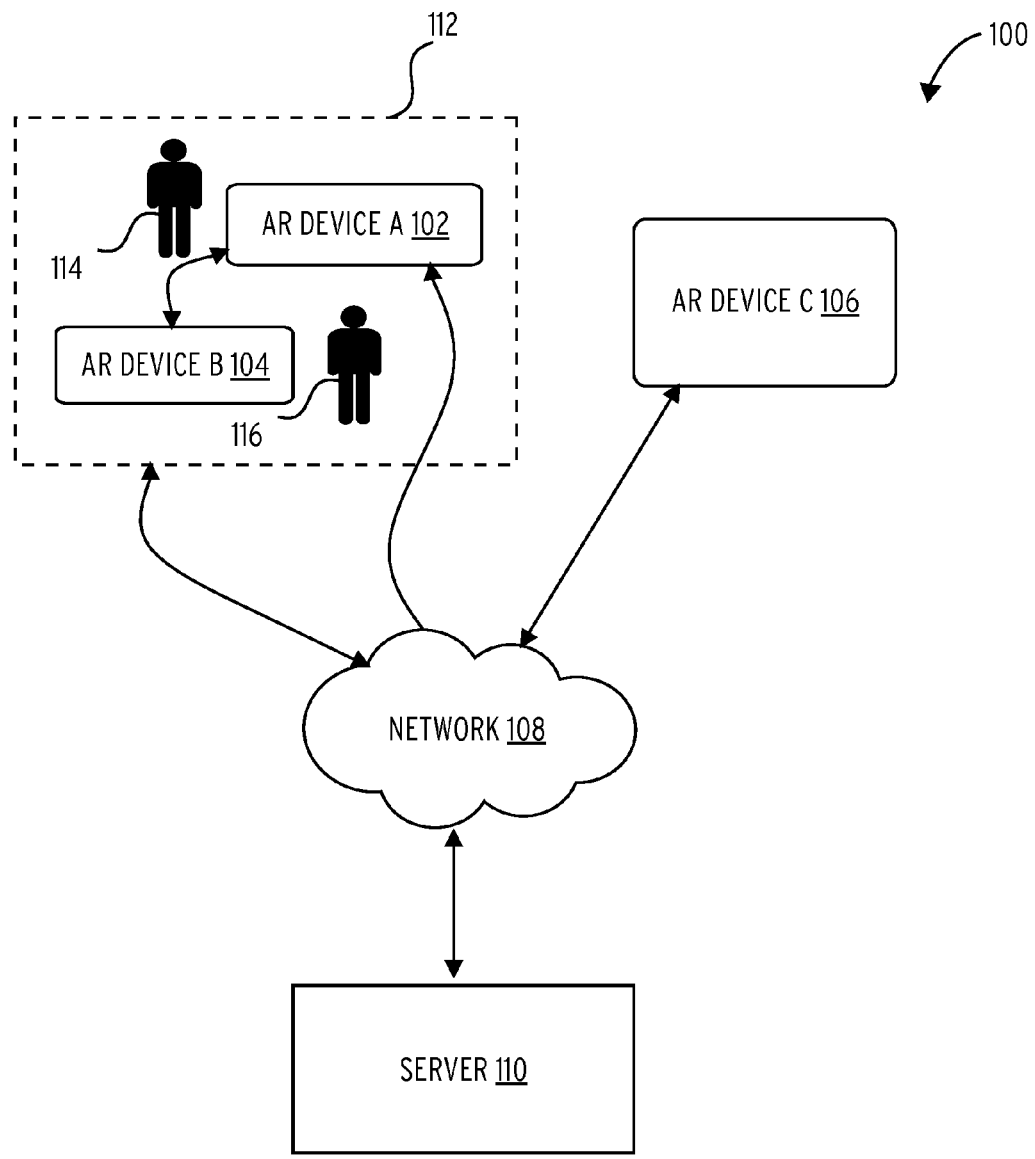
FIG. 1 is a block diagram illustrating an example of a network suitable for an augmented reality (AR) collaboration system, according to some example embodiments.

Example methods and systems are directed to contextual collaboration between connected AR devices. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR refers to a technology that allows a user of a display device to view directly (e.g., through a transparent lens) or indirectly (e.g., on a screen of a smartphone) a physical, real-world environment whose elements are augmented with virtual content (e.g., computer-generated sensory input such as sound, video, graphics). The information about the real-world environment becomes interactive and digitally manipulable. Furthermore, the information about the environment and its objects is overlaid on the real world. This information can be virtual or real, (e.g. seeing other real sensed or measured information such as non-visible radio signals overlaid in exact alignment with where they actually are in space).

When multiple AR devices are interconnected and used by multiple users, content and operations generated in one connected AR device may be provided or transferred to another connected AR device based on the capabilities and capacities of the connected AR devices (e.g., hardware and software configurations and availabilities), the profile of the users (e.g., authorization level, user profile), the tasks being performed at the connected AR devices, and the physical environment of the connected devices among others. In an interconnected environment, connected AR devices can serve one user or a task collaboratively. For example, a connected AR device can adjust a configuration of its hardware and software to improve the productivity and use the resources more efficiently by accessing the capabilities, capacities, and context of the other connected devices, and allocating operations and functionalities based on the capabilities, capacities, and context of the other connected devices.

In one example, a user wearing an AR device (e.g., eyewear) gets into a car. The car includes an AR application that allows drivers to view virtual content displayed on a windshield of the car. The display system is referred to as a head's up display (HUD) system. The HUD of the car takes over to provide better display and more powerful interfaces, while putting the AR device to hibernation to save power and reduce interference.

In another example, several users are working together on one project, with a predefined standardized workflow (e.g., process or tasks of users). Their individual AR devices are tuned to generate contents or interface with operations based on each user's task and procedure in the whole workflow, and their individual progresses. Access control of information is available based on each user's task or operation. Therefore, a portion of a task may be assigned to a first user of a first AR device with specific hardware while another portion of the task may be assigned to a second user of a second AR device with specific hardware.

In one example embodiment, an AR device includes a display, sensors, an AR application, and an AR context collaboration application implemented in one or more processors. The display includes (transparent) lenses that are disposed in front of the user's eyes to display AR content (e.g., virtual objects). The AR application renders the AR content for display in the transparent display of the AR device. The sensors may include a first set of sensors connected to the user of the AR device to generate user-based sensor data related to a user of the AR device, and a second set of sensors inside the AR device to generate ambient-based sensor data related to the AR device.

The first set of sensors measures data related to the user. For example, the first set of sensors is a biometric sensor that identifies and authenticates the user. The biometric sensor may include, for example, an ocular camera attached to the transparent display and directed towards the eyes of the user. In other examples, the first set of sensors measures at least one of a heart rate, a blood pressure, brain activity, and biometric data related to the user to generate the user-based sensor data using for example, a heart rate sensor, a sweat sensor, and the biometric sensor. In another example, the biometric sensor includes electroencephalogram (EEG)/electrocardiogram (ECG) sensors disposed inside a perimeter of the helmet so that the EEG/ECG sensors connect to the forehead of the user when the helmet is worn. The biometric sensor generates biometric data based on, for example, the blood vessel pattern in the retina of an eye of the user, the structure pattern of the iris of an eye of the user, the brain wave pattern of the user, or a combination thereof. The processor authenticates the user based on the biometric data of the user of the HMD.

The second set of sensors measures at least one of a geographic location of the HMD, an orientation and position of the HMD, an ambient pressure, an ambient humidity level, and an ambient light level to generate the ambient-based sensor data. Examples of the second set of sensors include a camera, GPS sensor, an Inertial Measurement Unit (IMU), a location sensor, an audio sensor, a barometer, a humidity sensor, and an ambient light sensor.

The AR context collaboration application determines capabilities and capacities of a current AR device, a task associated with the current AR device, a user-based context based on the user-based sensor data, and an ambient-based context based on the ambient-based sensor data. The user-based context identifies the user of the HMD (e.g., user is John, employee 123, senior technician), a state of mind of the user (e.g., John is distracted), and a physical state of the user (e.g., John is sweating and breathing heavily while staring at machine M). The ambient-based context identifies data related to a state of the HMD. For example, the ambient-based context identifies ambient data related to the location of the HMD. For example, the ambient data may identify a geographic location (e.g., HMD located at factory plant P), an elevation (e.g., HMD is located on the $3^{rd}$ floor of the factory plant P), ambient pressure (e.g., atmospheric pressure in a room where the HMD is located), ambient humidity level (e.g., HMD is located in a room with humidity level of 60%), ambient light level (e.g., ambient brightness of 200 lumen detected by the HMD), or ambient noise level (e.g., noise level of 90 db detected by the HMD).

The AR context collaboration application generates AR collaboration configurations for each connected AR device based on the AR devices capabilities and capacities, configurations, user-based context and the ambient-based context. For example, a first AR device may be put in hibernation mode while a second AR device takes over an operation of the first AR device because the second AR device includes a higher resolution display than the first AR device.

In one example embodiment, a first display device determines a first configuration of the first display device and a first context of a first AR application operating on the first display device. The first display device connects to a second display device and determines a second configuration of the second display device and a second context of a second AR application operating on the second display device. The first display device generates a first collaboration configuration for the display device and a second collaboration configuration for the second display device. The first and second collaborations are based on the first configuration, the first context, the second configuration, and the second context. The second display device modifies an operation of the second AR application based on the second collaboration configuration. The first display device modifies an operation of the first AR application in the display device based on the first collaboration configuration.

In another example embodiment, each AR device includes an AR application that identifies an object in an image captured with a camera of a respective AR device, retrieves a three-dimensional model of a virtual object from the AR content based on the identified object, and renders the three-dimensional model of the virtual object in a display of a corresponding AR device. The virtual object is perceived as an overlay on the real world object.

The display of the AR device may be retracted inside a head mounted device (e.g., helmet) and extended outside the helmet to allow a user to view the display. The position of the display surface may be adjusted based on an eye level of the user. The display surface includes a display lens capable of displaying AR content. The helmet may include a computing device such as a hardware processor with an AR application that allows the user wearing the helmet to experience information, such as in the form of a virtual object such as a three-dimensional (3D) virtual object, overlaid on an image or a view of a physical object (e.g., a gauge) captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the helmet.

The display lens may be transparent to allow the user see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet or other inputs from other devices, such as a wearable device. For example, the display lenses may extract or retract based on a voice command of the user, a gesture of the user, or a position of a watch in communication with the helmet.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR collaboration system, according to some example embodiments. The network environment 100 includes an AR device A 102, an AR device B 104, an AR device C 106, and a server 110, communicatively coupled to each other via a network 108. AR device A 102 is connected (e.g., wired or wirelessly) to AR device B 104 within a physical environment 112 (e.g., a room or a building). The AR devices 102, 104, 106 and the server 110 may each be implemented in a computer system, in whole or in part, as described below with respect to FIG. 11. The server 110 may be part of a network-based system. For example, the network-based system may be or include a cloud-based server system that provides collaboration configurations to the AR devices 102, 104, 106. In another example, the server 110 provides AR content (e.g., augmented information including 3D models of virtual objects related to physical objects in images captured by the AR devices) to the AR devices 102, 104, 106.

AR devices A 102, 104, 106, each include a display device for a corresponding user to view the AR content related to captured images of physical objects (not shown) in a real world physical environment. In one example embodiment, the AR device 102 includes a computing device with a camera and a display (e.g., smart glasses, smart helmet, smart visor, smart face shield, smart contact lenses). The computing device may be removably mounted to the head of the user 114. In one example, the display may be a screen that displays what is captured with a camera of the AR device 102. In another example, the display of the AR device 102 may be a transparent display, such as in the visor or face shield of a helmet, or a display lens distinct from the visor or face shield of the helmet.

The user 114 may be a user of an AR application in the AR device A 102. The user 114 may be a human user (e.g., a human being), a machine user (e.g., a computer configured by a software program to interact with the AR device A 102), or any suitable combination thereof (e.g., a human assisted by a machine or a machine supervised by a human). The user 114 is not part of the network environment 100, but is associated with the AR device A 102.

In one example embodiment, the AR application in the AR device A 102 determines the AR content to be rendered and displayed in the transparent lenses of the AR device A 102 based on capabilities and capacities of the AR device, user-context and ambient-context, and user tasks. The capabilities and capacities may be determined from the configuration of the AR device A 102. For example, the configuration may specify specifications related to the AR device A 102 such as the type of display, a resolution of the display, a type of processor, or a memory size. The configuration further identifies processing usage, memory usage, and sensor capabilities. The user context identifies a profile of the user (e.g., authorized user is part of the tech support team of an organization), and biometric data related to the user (e.g., user is sweating and his/her heart rate is beating fast). The ambient context identifies ambient data based on a local environment of the AR device A 102. For example, the ambient data identifies that the physical environment 112 (e.g., room) where the user 114 is located is hot and humid compared to a predefined temperature and humidity range. The user tasks identify a task of the user 114 (e.g., user is a technician fixing a machine in the physical environment 112).

In one example embodiment, the user context is based on sensor data related to the user 114 and includes measurements of a heart rate, a blood pressure, brain activity, and biometric data related to the user. The ambient context is based on sensor data related to the AR device A 102 and includes a geographic location of the AR device A 102, an orientation and position of the AR device A 102, an ambient pressure, an ambient humidity level, an ambient light level, and an ambient noise level detected by sensors in the AR device A 102. The sensor data related to the user 114 may also be referred to as user-based sensor data. The sensor data related to the AR device A 102 may be also referred to as ambient-based sensor data.

The AR device A 102 detects that the AR device B 104 is located in the same physical environment. The AR device A 102 connects to the AR device B 104 to exchange configuration information. An AR context collaboration application in both AR devices 102, 104 processes the configuration information, and determines which operation, function, hardware component (e.g., cameras) to operate on which AR device. For example, the AR context collaboration application determines that the AR device A 102 includes a higher resolution camera than the camera of AR device B 104. The AR context collaboration application assigns the image capturing process to the AR device A 102. In another example, the AR context collaboration application determines that the AR device A 102 includes a higher resolution display than the display of the AR device B 104. The AR context collaboration application assigns the display process to the AR device A 102.

The AR context collaboration operates on connected AR devices within a same physical environment 112. For example, the AR device C 106 is not connected to either the AR device A 102 or AR device B 104 because AR device C 106 is not in the same physical environment 112 as AR device A 102 and AR device B 104.

In another example, the contextual configuration of the AR device A 102 includes using a microphone in the AR device A 102 when the user 114 is on the first floor of a building. The AR context collaboration application determines that both AR devices 102, 104 are located on the first floor and that the task of each AR device requires listening to ambient noise from the first floor. When the user 114 moves to the second floor of the building, the contextual configuration of the AR device A 102 changes to include using a microphone of the AR device B 104.

In another example embodiment, each AR device 102, 104 provides the corresponding user 114, 116 with an AR experience triggered by identified objects in the physical environment 112. The physical environment 112 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 112. The AR application may include computer vision recognition to determine corners, objects, lines, and letters. The user 102 may point a camera of the AR device to capture an image of the physical objects in the physical environment 112.

In one example embodiment, physical objects in the environment 112 are tracked and recognized locally in the AR devices 102, 104 using a local context recognition dataset or any other previously stored dataset of the AR application of the AR devices 102, 104. The local context recognition dataset module may include a library of virtual objects associated with real-world physical objects or references. In one example, the AR devices 102, 104 identify feature points in an image of the physical objects to determine different planes (e.g., edges, corners, surface, dial, letters). The AR devices 102, 104 also identify tracking data related to the physical objects (e.g., GPS location of the AR devices 102, 104, orientation, distances to objects). If the captured image is not recognized locally at the AR devices 102, 104, the AR devices 102, 104 can download additional information (e.g., 3D model or other augmented data) corresponding to the captured image, from a database of the server 110 over the network 108.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 9-10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMD 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
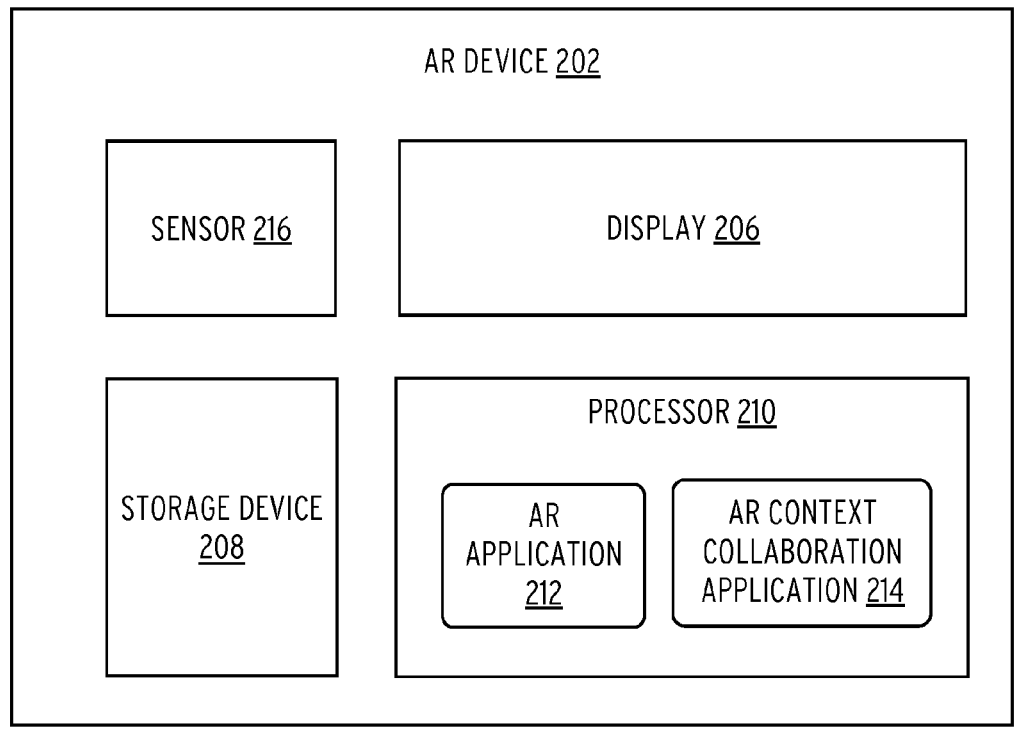
FIG. 2 is a block diagram illustrating an example embodiment of an AR device.

FIG. 2 is a block diagram illustrating modules (e.g., components) of an AR device 202, according to some example embodiments. The AR device 202 may be a display device that includes sensors 216, a display 206, a storage device 208, and a processor 210. The AR device 202 includes and may not be limited to a head-mounted device (e.g., smart helmet, visor, headband, hat, glasses).

The sensors 216 measure internal tracking data of the AR device 202 to determine a position and an orientation of the AR device 202. The position and the orientation of the AR device 202 may be used to identify real world objects in a field of view of the AR device 202. For example, a virtual object may be rendered and displayed in the display 206 when the sensors 216 indicate that the AR device 202 is oriented towards a real world object (e.g., when a user of the AR device 202 looks at a physical object) or in a particular direction (e.g., when the user tilts his head to look at his smart watch). The AR device 202 may display a virtual object also based on a geographic location of the AR device 202. For example, a set of virtual objects may be accessible when the user of the AR device 202 is located in a particular building. In another example, virtual objects including sensitive material may be accessible when the user of the AR device 202 is located within a predefined area associated with the sensitive material and the user is authenticated. Different levels of content of the virtual objects may be accessible based on a credential level of the user. For example, a user who is an executive of a company may have access to more information or content in the virtual objects than a manager at the same company. The sensors 216 may be used to authenticate the user prior to providing the user with access to the sensitive material (e.g., information displayed as a virtual object such as a virtual dialog box in a see-through display). Authentication may be achieved via a variety of methods such as providing a password or an authentication token, or using sensors 216 to determine biometric data unique to the user.

Examples of sensors include a camera, an audio sensor, an IMU (Inertial Measurement Unit) sensor, a location sensor, a barometer, a humidity sensor, a light sensor, and a biometric sensor. It is noted that the sensors described herein are for illustration purposes. Sensors 216 are thus not limited to the ones described.

The camera includes an optical sensor(s) (e.g., camera) that may encompass different spectrums. The camera includes one or more external cameras aimed outside the AR device 202. For example, the external camera includes an infrared camera or a full-spectrum camera. The external camera includes a rear-facing camera and a front-facing camera disposed in the AR device 202. The front-facing camera may be used to capture a front field of view of the AR device 202 while the rear-facing camera may be used to capture a rear field of view of the AR device 202. The pictures captured with the front- and rear-facing cameras may be combined to recreate a 360-degree view of the physical world around the AR device 202.

The camera may also include one or more internal cameras aimed at the user. The internal camera includes an infrared (IR) camera configured to capture an image of a retina of the user. The IR camera may be used to perform a retinal scan to map unique patterns of the retina of the user. Blood vessels within the retina absorb light more readily than the surrounding tissue in the retina and therefore can be identified with IR lighting. The IR camera may cast a beam of IR light into the user's eye as the user looks through the display (e.g., lenses) towards virtual objects rendered in the display. The beam of IR light traces a path on the retina of the user. Because retinal blood vessels absorb more of the IR light than the rest of the eye, the amount of reflection varies during the retinal scan. The pattern of variations may be used as a biometric data unique to the user.

In another example embodiment, the internal camera includes an ocular camera configured to capture an image of an iris of the eye of the user 102. In response to the amount of light entering the eye, muscles attached to the iris expand or contract the aperture at the center of the iris, known as the pupil. The expansion and contraction of the pupil depends on the amount of ambient light. The ocular camera may use iris recognition as a method for biometric identification. The complex pattern on the iris of the eye of the user is unique and can be used to identify the user. The ocular camera may cast infrared light to acquire images of detailed structures of the iris of the eye of the user. Biometric algorithms may be applied to the image of the detailed structures of the iris to identify the user.

The audio sensor includes a microphone. For example, the microphone is used to record a voice command from the user of the AR device 202. In other examples, the microphone is used to measure ambient noise level to determine an intensity of background noise ambient to the AR device 202. In another example, the microphone is used to capture ambient noise. Analytics may be applied to the captured ambient noise to identify specific types of noises such as explosions or gunshot noises.

The IMU sensor includes a gyroscope and an inertial motion sensor to determine an orientation and movement of the AR device 202. For example, the IMU sensor may measure the velocity, orientation, and gravitational forces on the AR device 202. The IMU sensor may also detect a rate of acceleration using an accelerometer and changes in angular rotation using a gyroscope.

The location sensor determines a geolocation of the AR device 202 using a variety of techniques such as near field communication, GPS, Bluetooth, and Wi-Fi. For example, the location sensor may generate geographic coordinates of the AR device 202.

The barometer measures atmospheric pressure differential to determine an altitude of the AR device 202. For example, the barometer is used to determine whether the AR device 202 is located on a first floor or a second floor of a building.

The humidity sensor determines a relative humidity level ambient to the AR device 202. For example, the humidity sensor determines the humidity level of a room in which the AR device 202 is located.

The ambient light sensor determines an ambient light intensity around the AR device 202. For example, the ambient light sensor 314 measures the ambient light in a room in which the AR device 202 is located.

The biometric sensor includes sensors configured to measure biometric data unique to the user of the AR device 202. In one example embodiment, the biometric sensors includes an ocular camera, an EEG (electroencephalogram) sensor, and an ECG (electrocardiogram) sensor. It is noted that the descriptions of biometric sensors disclosed herein are for illustration purposes. The biometric sensor is thus not limited to any of the ones described.

The EEG sensor includes, for example, electrodes that, when in contact with the skin of the head of the user, measures electrical activity of the brain of the user. The EEG sensor also measures the electrical activity and wave patterns through different bands of frequency (e.g., Delta, Theta, Alpha, Beta, Gamma, Mu). EEG signals may be used to authenticate a user based on fluctuation patterns unique to the user.

The ECG sensor includes, for example, electrodes that measure a heart rate of the user. In particular, the ECG may monitor and measure the cardiac rhythm of the user. A biometric algorithm is applied to the user to identify and authenticate the user. In one example embodiment, the EEG sensor and ECG sensor may be combined into a same set of electrodes to measure both brain electrical activity and heart rate. The set of electrodes may be disposed around the helmet so that the set of electrodes comes into contact with the skin of the user 102 when the user wears the AR device 202.

The display 206 includes a display surface or lens capable of displaying AR content (e.g., images, video) generated by the processor 210. The display 206 may be transparent so that the user can see through the display 206 (e.g., such as in a head-up display).

The storage device 208 stores a library of AR content, AR device configurations and specifications, AR context collaboration configurations. The AR content may include two or three-dimensional models of virtual objects with corresponding audio. In other examples, the AR content may include an AR application that includes interactive features such as displaying additional data (e.g., location of sprinklers) in response to the user input (e.g., a user says "show me the locations of the sprinklers" while looking at an AR overlay showing location of the exit doors). AR applications may have their own different functionalities and operations. Therefore, each AR application may operate distinctly from other AR applications.

The AR device configurations and specifications include information identifying the capabilities and capacities of each AR device connected to the AR device 202. The AR context collaboration configuration includes information identifying which process, operation, or hardware to perform, activate, or deactivate on which connected AR device.

The processor 210 includes an AR application 212 and an AR context collaboration application 214. The AR application 212 generates a display of information related to the physical objects detected by the AR device 202. For example, the AR application 212 generates a display of a holographic or virtual menu visually perceived as a layer on the physical objects.

The AR context collaboration application 214 determines a configuration (e.g., capacities, capabilities, context) of the AR device 202 and a configuration of AR devices connected to the AR device 202. The AR context collaboration application 214 determines which AR device is better suited to operate a function or process of the AR application 212 based on a comparison of the configurations of the connected AR devices. For example, the AR context collaboration application 214 determines that the AR devices 202 are working on a same project. The AR context collaboration application 214 optimizes the workflow by breaking down portions of the project that can be performed by users of the connected AR devices. For example, a user of a connected AR device located at a particular location with a particular tool is better suited to perform task A than other users of connected AR devices located at other locations. In another example, a user with particular credentials or experience may be better suited to perform a task than other users of other connected AR devices. In yet another example, the AR context collaboration application 214 determines a user of a connected AR device is becoming more agitated and nervous based on biometric data. The AR context collaboration application 214 determines that another user of another connected AR device is calmer and can perform the same task as the agitated user. The AR context collaboration application 214 dynamically reallocates the task from the agitated user to the calmer user. AR devices are connected when within a predefined proximity to one another.

Any one or more of the modules described herein may be implemented using hardware (e.g., a processor 210 of a machine) or a combination of hardware and software. For example, any module described herein may configure a processor 210 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
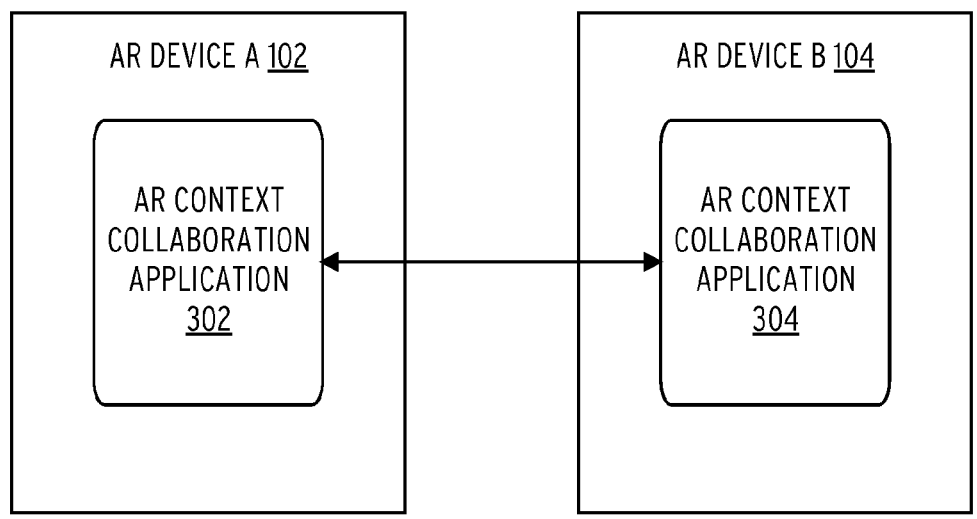
FIG. 3 is a block diagram illustrating an example of a collaboration between two AR devices.

FIG. 3 is a block diagram illustrating an example of a collaboration between two connected AR devices. The AR device 102 determines that the AR device 104 is within a predefined distance (e.g., within a same building) of the AR device 102. Once detected that the AR devices are in proximity to one another, the AR context collaboration application 302 of the AR device 102 communicates and exchanges configuration and context information with the AR context collaboration application 304 of the AR device 104.

Figure 4:
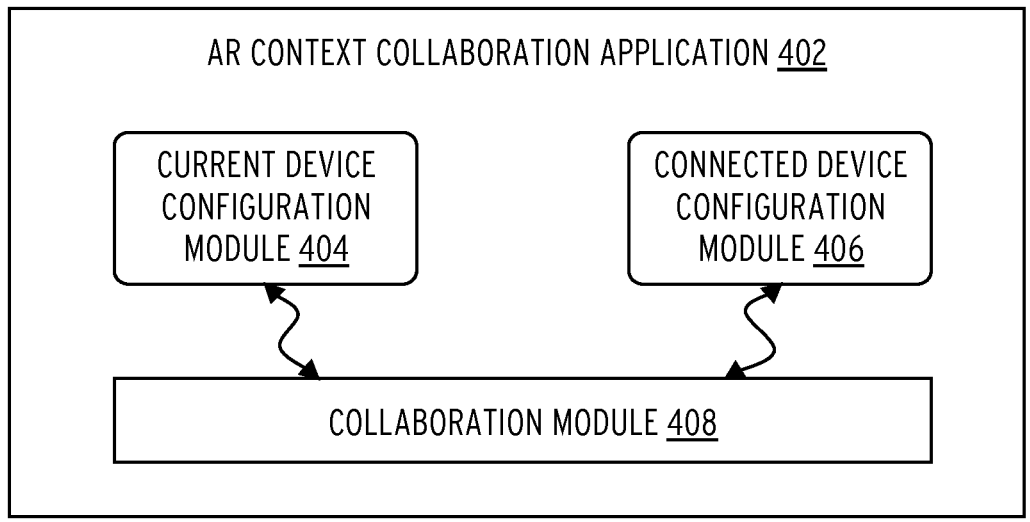
FIG. 4 is a block diagram illustrating an example embodiment of an AR context collaboration application.

FIG. 4 is a block diagram illustrating an example embodiment of an AR context collaboration application 402. The AR context collaboration application 402 includes a current device configuration module 404, a connected device configuration module 406, and a collaboration module 408. The current device configuration module 404 determines and identifies configuration settings of the current AR device including capabilities of the current AR device (e.g., display has 1080p resolution, infrared sensor), capacities of the current AR device (e.g., processor is running at 10% capacity, RAM usage is 40%), and context of the current AR device (e.g., user-based context, ambient-based context). Similar to the current device configuration module 404, the connected device configuration module 406 determines and identifies configuration settings of the connected AR device including capabilities of the connected AR device (e.g., display has 720p resolution, infrared sensor), capacities of the connected AR device (e.g., processor is running at 60% capacity, RAM usage is 80%), and context of the connected AR device (e.g., user-based context, ambient-based context).

The collaboration module 408 retrieves the configuration settings of the current AR device from the current device configuration module 404 and the configuration settings of the connected AR device configuration module 406. The collaboration module 408 determines which AR device is better suited to perform an operation or a process based on the configuration settings of both the current and connected AR devices. For example, the collaboration module 408 compares the hardware specifications, software specification, capabilities and capacities, and context of the connected AR devices to determine which AR device is better capable or more efficient to perform an operation.

Figure 5:
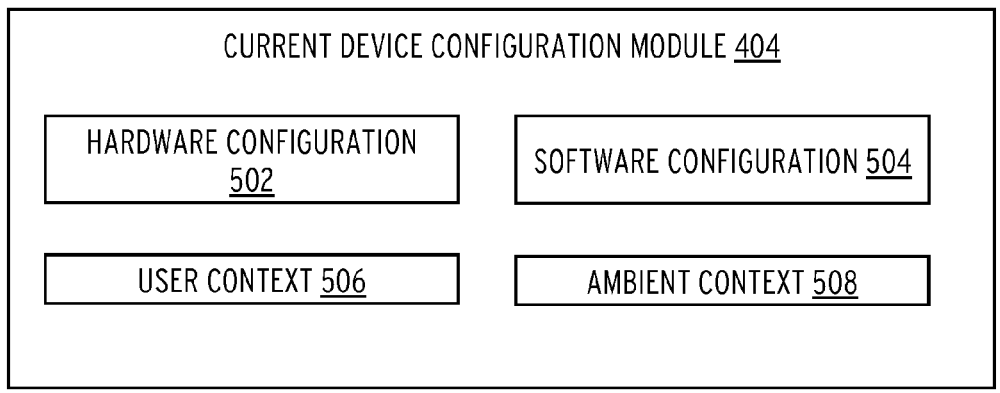
FIG. 5 is a block diagram illustrating an example embodiment of a current device configuration module.

FIG. 5 is a block diagram illustrating an example embodiment of the current device configuration module 404 of FIG. 4. The current device configuration module 404 identifies a hardware configuration 502, a software configuration 504, a user context 506, and an ambient context 508. The hardware configuration 502 identifies technical specifications (e.g., processor model x, camera model y, display model z with resolution z') related to the hardware of the current AR device. The software configuration 502 identifies technical specifications related to the software (e.g., AR Operating System version x) operating in the current AR device. The user context 506 includes user profile, credential, authentication, biometric data, and assigned AR task. The ambient context 508 includes ambient-based sensor data such as location, temperature, and AR task being performed.

FIG. 6 is a block diagram illustrating an example embodiment of a connected device configuration module 406 of FIG. 4. The connected device configuration module 406 includes a profile extraction module 604 that communicates with the AR application of a connected AR device to retrieve configuration settings of the connected AR device. For example, the current AR device authenticates with the connected AR device in response to detecting that both are located within a same physical environment. The current AR device then queries the connected AR device for the configuration settings of the connected AR device.

Figure 7:
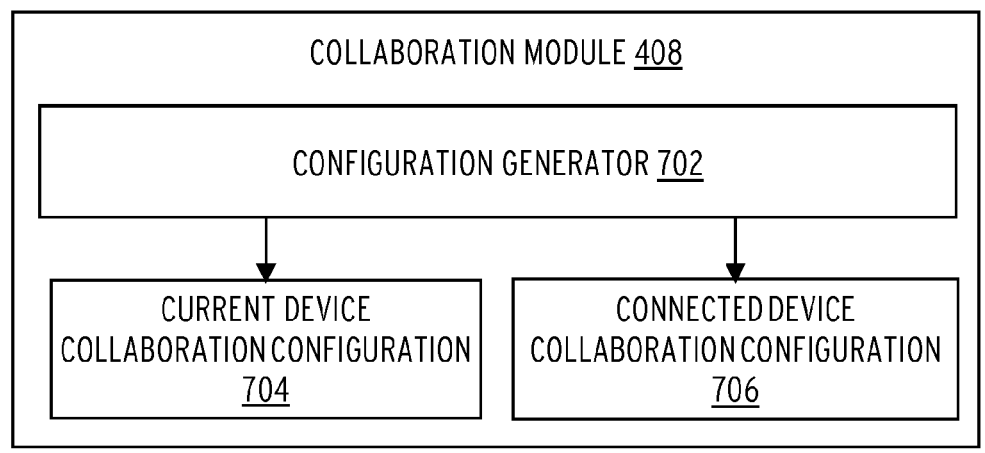
FIG. 7 is a block diagram illustrating an example embodiment of a collaboration module.

FIG. 7 is a block diagram illustrating an example embodiment of the collaboration module 408 of FIG. 4. The collaboration module 408 includes a configuration generator 702 that generates a current device collaboration configuration 704 and a connected device collaboration configuration 706 based on a comparison of the configuration settings from both the current AR device and the connected AR device. The collaboration module 408 identifies which AR device is better capable or more efficient to perform an operation of either connected AR devices. For example, the collaboration module 408 determines when the display of a car has a better resolution than smart glasses. The collaboration module 408 provides the current device collaboration configuration 704 to the smart glasses to direct the smart glasses to go into hibernation mode. The current device collaboration configuration 704 modifies an operation of the AR application in the smart glasses. The collaboration module 408 provides the connected device collaboration configuration 706 to the car to seamlessly take over a display of AR content from the smart glasses. The connected device collaboration configuration 706 modifies an operation of the AR application in the car.

Figure 8:
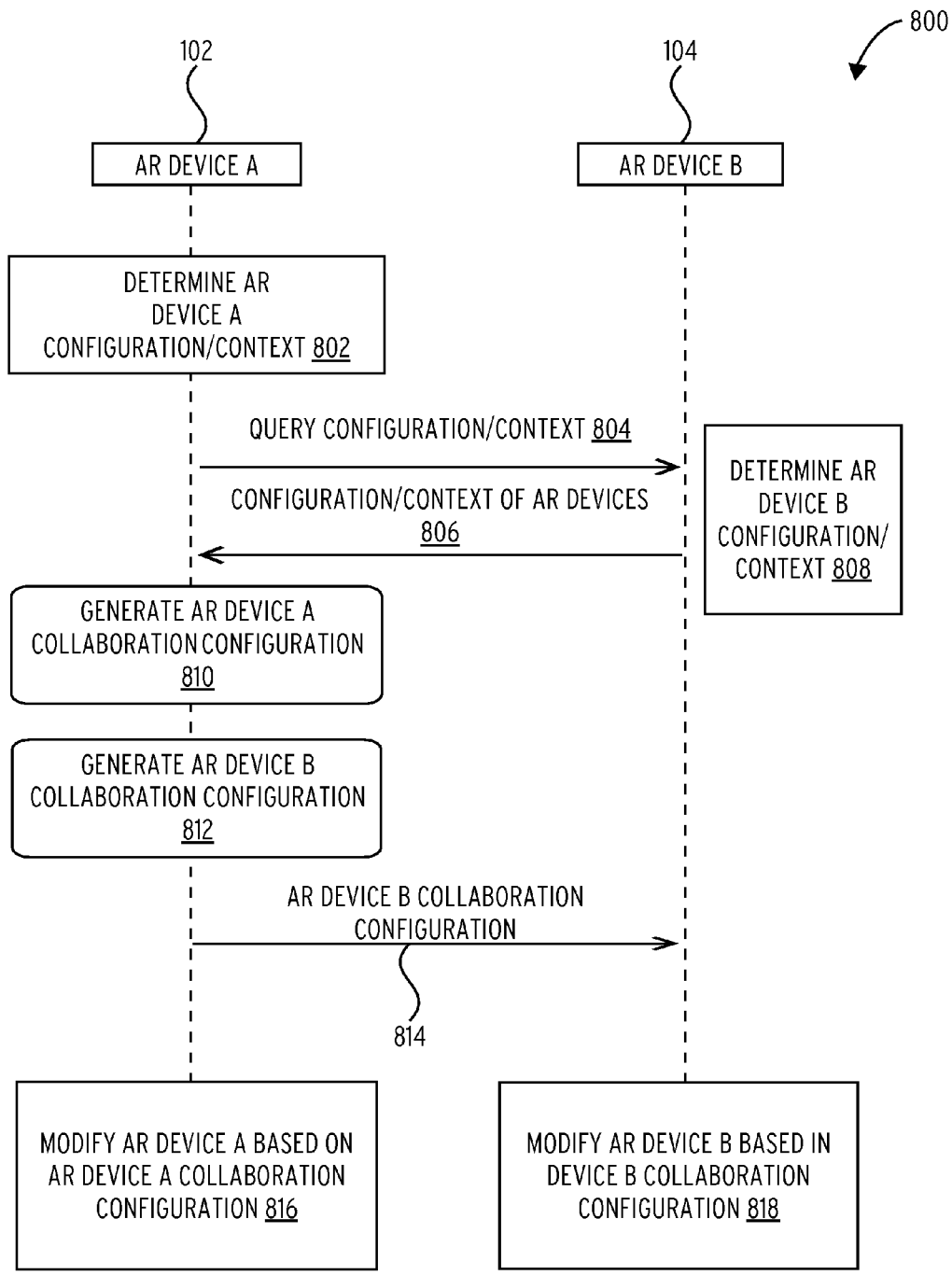
FIG. 8 is an interaction diagram illustrating interactions between two AR devices, according to an example embodiment.

FIG. 8 is an interaction diagram illustrating interactions between two AR devices, according to an example embodiment. The AR device 102 determines an AR device A configuration and context at operation 802. At operation 804, the AR device 102 sends a query for a configuration/context of the AR device B 104. The AR device 104 determines an AR device B configuration and context at operation 808. At operation 806, the AR device 104 sends the AR device B configuration and context to the AR device A 102. At operation 810, the AR device A 102 generates AR device A collaboration configuration. At operation 812, the AR device A 102 generates AR device B collaboration configuration. At operation 814, the AR device A 102 sends the AR device B collaboration configuration to the AR device B 104. At operation 816, the operation of the AR device A 102 is modified based on the AR device A collaboration configuration. At operation 818, the operation of the AR device B 104 is modified based on the AR device B collaboration configuration received at operation 814.

Figure 9:
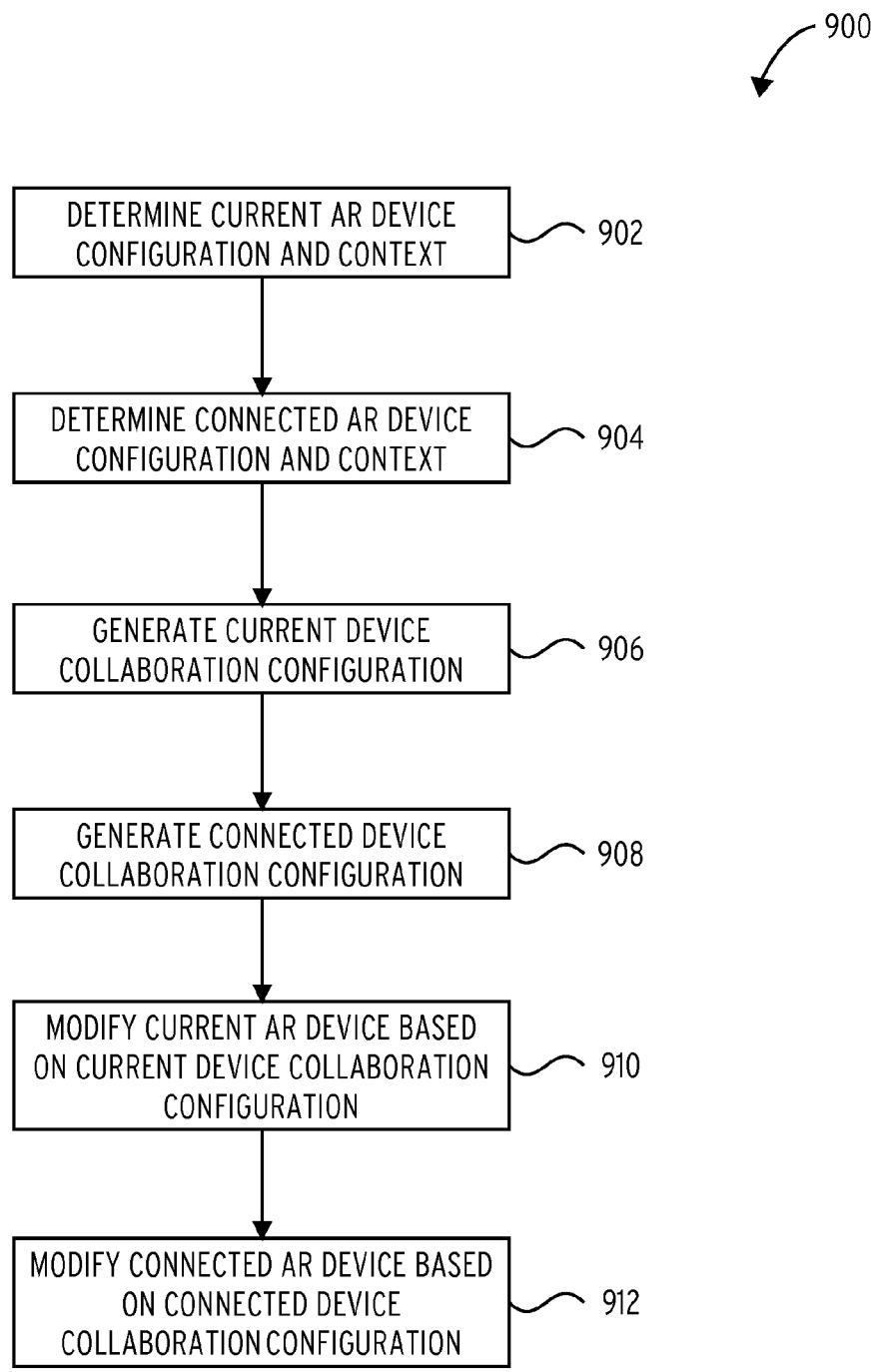
FIG. 9 is a flow diagram illustrating a method for contextual collaboration between augmented reality devices.

FIG. 9 is a flow diagram illustrating a method 900 for contextual collaboration between augmented reality devices. At operation 902, an AR device determines its configuration and context. In one example embodiment, operation 902 can be implemented with the current device configuration module 404. At operation 904, the AR device determines a connected AR device configuration and context. In one example embodiment, operation 904 can be implemented with the connected device configuration module 406. At operation 906, the AR device generates a current device collaboration configuration. In one example embodiment, operation 906 can be implemented with the collaboration module 408. At operation 908, the AR device generates a connected device collaboration configuration. In one example embodiment, operation 908 can be implemented with the collaboration module 408. At operation 910, the AR device modifies its functionality and operation based on the current device collaboration configuration. At operation 912, the connected AR device modifies its functionality and operation based on the connected device collaboration configuration.

Figure 10:
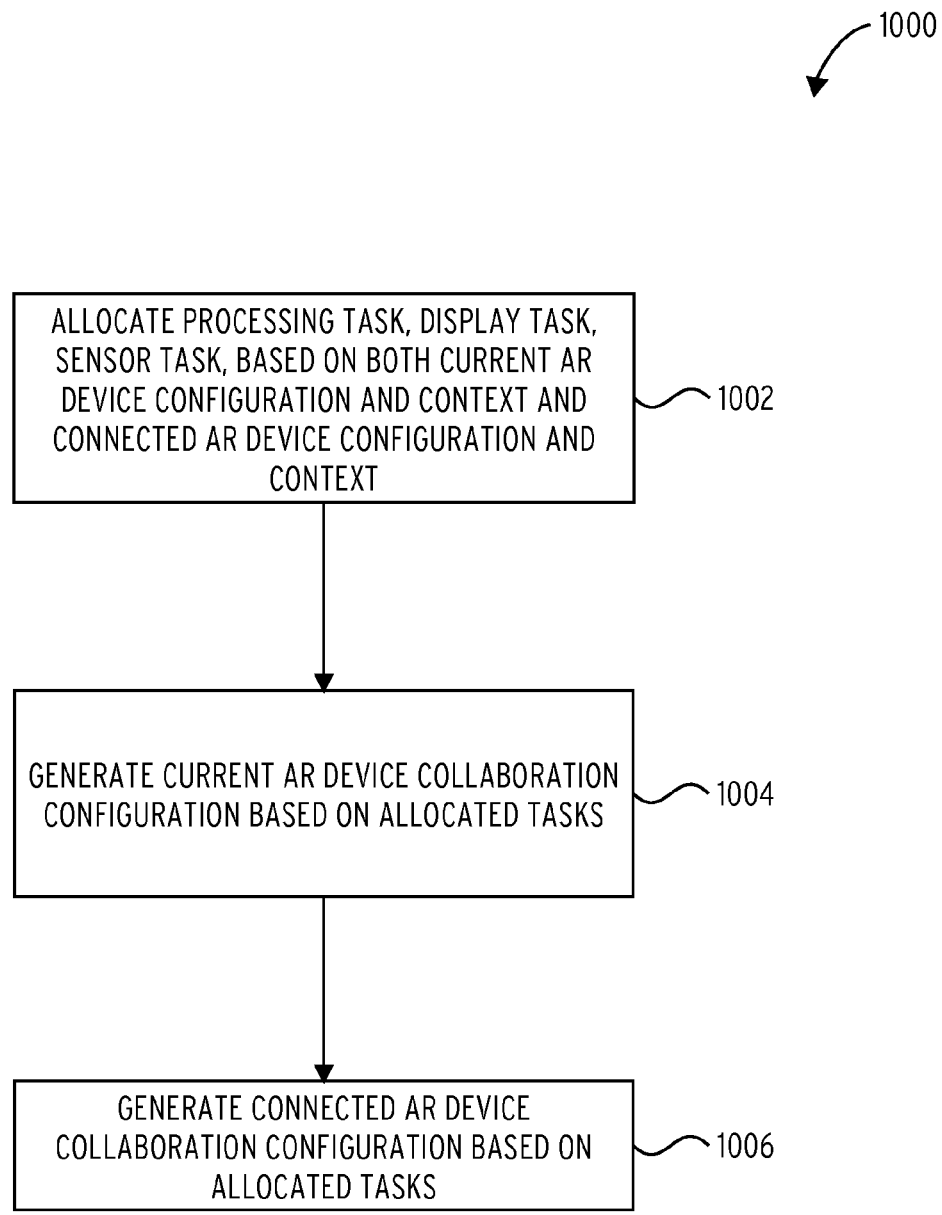
FIG. 10 is a flow diagram illustrating a method for generating collaboration configurations for connected augmented reality devices.

FIG. 10 is a flow diagram illustrating a method for generating collaboration configurations for connected augmented reality devices. At operation 1002, the collaboration module 408 allocates processing tasks, display tasks, and sensor tasks based on the current AR device configuration and context, and the connected AR device configuration and context. At operation 1004, the collaboration module 408 generates a current AR device collaboration configuration based on the allocated tasks for the current AR device. At operation 1006, the collaboration module 408 generates a connected AR device collaboration configuration based on the allocated tasks for the connected AR device.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 210 or a group of processors 210) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 210 or other programmable processor 210) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 210 configured using software, the general-purpose processor 210 may be configured as respective different hardware modules at different times. Software may accordingly configure a processor 210, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 210 that are temporarily configured (e.g., by software) or permanently configured to perform the relevant operations. Whether temporarily or permanently configured, such processors 210 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 210 or processor-implemented modules. The performance of certain operations may be distributed among the one or more processors 210, not only residing within a single machine, but deployed across a number of machines. In some example embodiments, the processor or processors 210 may be located in a single location (e.g., within a home environment, an office environment or as a server farm), while in other embodiments the processors 210 may be distributed across a number of locations.

The one or more processors 210 may also operate to support performance of the relevant operations in a "cloud computing" environment or as a "software as a service" (SaaS). For example, at least some of the operations may be performed by a group of computers (as examples of machines including processors 210), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 210, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 210 executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 210), or a combination of permanently and temporarily configured hardware may be a design choice. Below are set out hardware (e.g., machine) and software architectures that may be deployed, in various example embodiments.

Example Machine Architecture

Figure 11:
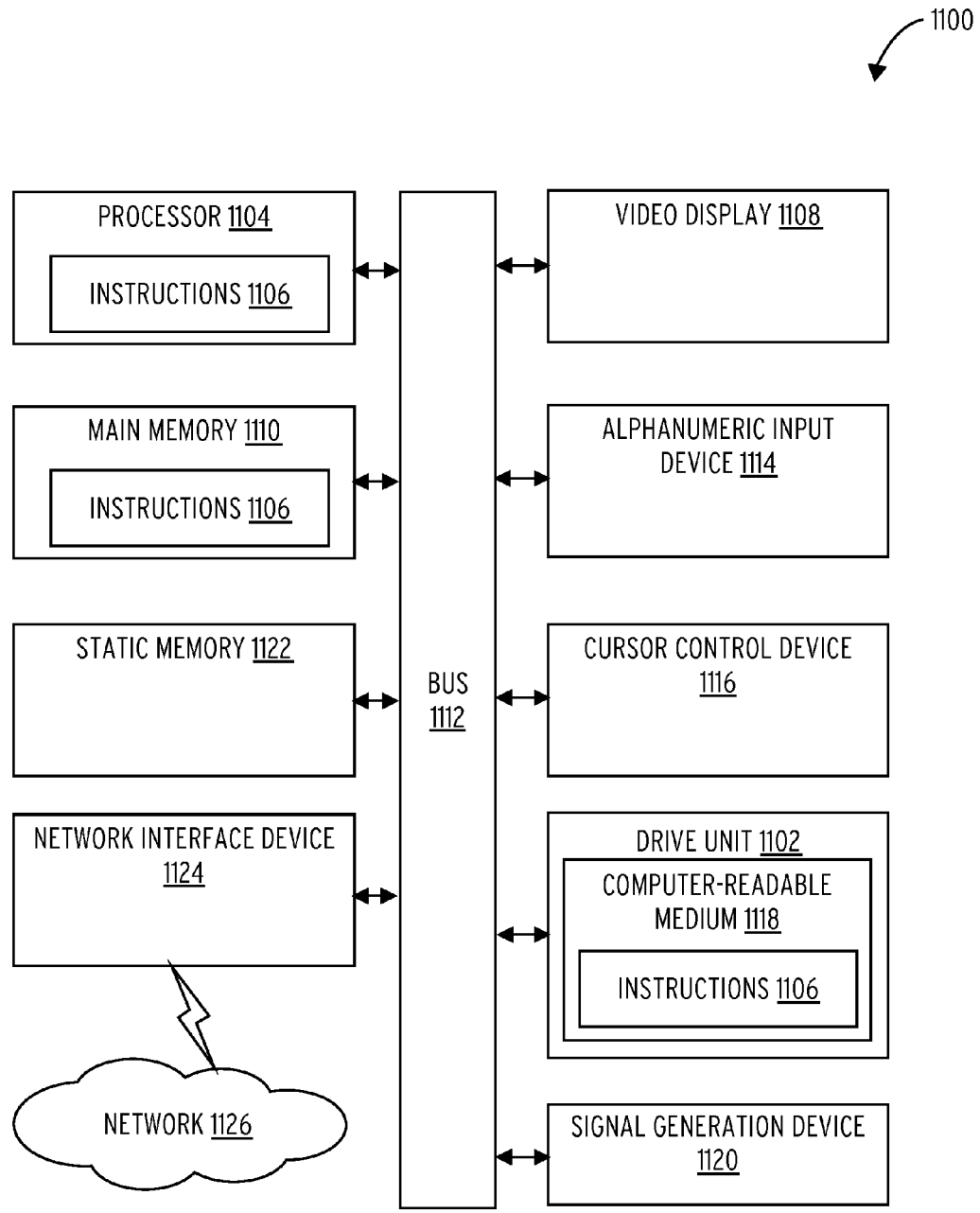
FIG. 11 is a block diagram illustrating components of a machine, according to some example embodiments, able to read instructions from a machine-readable medium and perform any one or more of the methodologies discussed herein.

FIG. 11 is a block diagram of a machine in the example form of a computer system 1100 within which instructions 1106 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1106 (sequential or otherwise) that specify actions to be taken by that machine. Further, while only a single machine is illustrated, the term "machine" shall also be taken to include any collection of machines that individually or jointly execute a set (or multiple sets) of instructions 1106 to perform any one or more of the methodologies discussed herein.

The example computer system 1100 includes a processor 1104 (e.g., a central processing unit (CPU), a graphics processing unit (GPU) or both), a main memory 1110 and a static memory 1122, which communicate with each other via a bus 1112. The computer system 1100 may further include a video display unit 1108 (e.g., a liquid crystal display (LCD) or a cathode ray tube (CRT)). The computer system 1100 also includes an alphanumeric input device 1114 (e.g., a keyboard), a user interface (UI) navigation (or cursor control) device 1116 (e.g., a mouse), a disk drive unit 1102, a signal generation device 1120 (e.g., a speaker) and a network interface device 1124.

Machine-Readable Medium

The disk drive unit 1102 includes a computer-readable medium 1118 on which is stored one or more sets of data structures and instructions 1106 (e.g., software) embodying or utilized by any one or more of the methodologies or functions described herein. The instructions 1106 may also reside, completely or at least partially, within the main memory 1110 and/or within the processor 1104 during execution thereof by the computer system 1100, the main memory 1110 and the processor 1104 also constituting machine-readable media 1118. The instructions 1106 may also reside, completely or at least partially, within the static memory 1122.

While the machine-readable medium 1118 is shown in an example embodiment to be a single medium, the term "machine-readable medium" may include a single medium or multiple media (e.g., a centralized or distributed database, and/or associated caches and servers 110) that store the one or more instructions 1106 or data structures. The term "machine-readable medium" shall also be taken to include any tangible medium that is capable of storing, encoding, or carrying instructions 1106 for execution by the machine and that causes the machine to perform any one or more of the methodologies of the present embodiments, or that is capable of storing, encoding, or carrying data structures utilized by or associated with such instructions 1106. The term "machine-readable medium" shall accordingly be taken to include, but not be limited to, solid-state memories, and optical and magnetic media. Specific examples of machine-readable media 1118 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1106 may further be transmitted or received over a communications network 1126 using a transmission medium. The instructions 1106 may be transmitted using the network interface device 1124 and any one of a number of well-known transfer protocols (e.g., HTTP). Examples of communication networks 1126 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1106 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following enumerated embodiments describe various example embodiments of methods, machine-readable media, and systems (e.g., machines, devices, or other apparatus) discussed herein.

A first embodiment provides a first display device (e.g., a first AR device) comprising:
one or more hardware processors; and
a memory storing instructions that, when executed by the one or more hardware processors, configure the first display device to perform operations comprising:
determining a first configuration of the first display device and a first context of a first AR application operating on the first display device;
connecting to a second display device;
determining a second configuration of the second display device and a second context of a second AR application operating on the second display device;
generating a first collaboration configuration for the first display device and a second collaboration configuration for the second display device, the first and second collaborations based on the first configuration, the first context, the second configuration, and the second context, the second display device configured to modify an operation of the second AR application based on the second collaboration configuration; and
modifying an operation of the first AR application in the first display device based on the first collaboration configuration.

A second embodiment provides a device according to the first embodiment, wherein the operations further comprises:
identifying a common process between the first and second display devices based on a common operation identified in the first and second configurations and in the first and second contexts;
determining that the first display device is configured to perform the common process more efficiently than the second display device;
assigning the common process to the first display device in the first collaboration configuration; and
removing the common process from the second display device in the second collaboration configuration.

A third embodiment provides a device according to the first embodiment, wherein modifying the operation of the first AR application in the first display device further comprises:
disabling a first display of the first display device; and
causing a second display of the second display device to display content from the first AR application using the second collaboration configuration on the second AR application of the second display device.

A fourth embodiment provides a device according to the first embodiment, wherein the operations further comprises:
identifying that a first task of a first user of the first display device and a second task of a second user of the second display device are part of a general workflow;
generating a first content and a first user interface for the first user of the first display device based on the first task, the first collaboration configuration including the first content and the first user interface; and
generating a second content and a second user interface for the second user of the first display device based on the second task, the second collaboration configuration including the second content and the second user interface.

A fifth embodiment provides a device according to the first embodiment, wherein the first configuration includes hardware and software specifications of the first display device, and hardware and software resource capacities and availabilities.

A sixth embodiment provides a device according to the first embodiment, wherein the first context includes user-based context and ambient-based context of the display device,
the user-based context based on a user profile of a first user of the first display device, a user credential of the first user, biometric data related to the first user, the biometric data including at least one of a heart rate, a blood pressure, or brain activity,
the ambient-based context including geographic location of the display device, an orientation and position of the first display device, an ambient pressure, an ambient humidity level, or an ambient light level.

A seventh embodiment provides a device according to the first embodiment, wherein the first collaboration configuration includes allocation instructions of operations and tasks from the first AR application and the second AR application between the first display device and the second display device.

An eight embodiment provides a device according to the first embodiment, further comprising:
a display; and
a plurality of sensors including a first set of sensors configured to measure first sensor data related to a user of the HMD, and a second set of sensors configured to measure second sensor data related to the HMD,
wherein the operations further comprises:
determining a user-based context based on the first set of sensors, determining an ambient-based context based on the second set of sensors, and
generating AR content based on the user-based context and the ambient-based context, the first AR application being configured to display the AR content in the display.

A ninth embodiment provides a device according to the first embodiment, wherein the operations further comprises:
modifying the AR content based on the first collaboration configuration; and
causing a display of the modified AR content in the display of the first display device.

A tenth embodiment provides a device according to the first embodiment, wherein the operations further comprises:
determining a first authorization level of the first user based on the user-based context and the ambient-based context; and
determining a second authorization level of a second user of the second display device based on a user-based context of the second user and an ambient-based context of the second display device,
wherein the first and second collaboration configurations are based on the first authorization level of the first user and the second authorization level of the second user.

What is claimed is:
1. A first display device comprising:
one or more hardware processors; and
a memory storing instructions that, when executed by the one or more hardware processors, configure the first display device to perform operations comprising:
determining a first device configuration of the first display device and a first context of a first AR application operating on the first display device;
connecting to a second display device;

determining a second device configuration of the second display device and a second context of a second AR application operating on the second display device;

generating a first collaboration configuration for the first display device and a second collaboration configuration for the second display device, the first and second collaboration configurations being generated based on the first device configuration, the first context, the second device configuration, and the second context, the second display device being configured to modify an operation of the second AR application based on the second collaboration configuration; and modifying an operation of the first AR application in the first display device based on the first collaboration configuration.

2. The display device of claim 1, wherein the operations further comprise:

identifying a common process executed by the first and second display devices based on a common operation identified in the first and second configurations and in the first and second contexts;

determining that the first display device is configured to perform the common process more efficiently than the second display device;

assigning the common process to the first display device in the first collaboration configuration; and removing the common process from the second display device in the second collaboration configuration.

3. The display device of claim 1, wherein the modifying of the operation of the first AR application in the first display device comprises:

disabling a first display of the first display device; and causing a second display of the second display device to display content from the first AR application using the second collaboration configuration on the second AR application of the second display device.

4. The display device of claim 1, wherein the operations further comprise:

determining that a first task of a first user of the first display device and a second task of a second user of the second display device are part of a general workflow;

generating first content and a first user interface for the first user of the first display device based on the first task, the first collaboration configuration including the first content and the first user interface; and generating a second content and a second user interface for the second user of the first display device based on the second task, the second collaboration configuration including the second content and the second user interface.

5. The display device of claim 1, wherein the first configuration includes hardware and software specifications of the first display device, and hardware and software resource capacities and availabilities.

6. The display device of claim 1, wherein the first context includes a user-based context and an ambient-based context of the display device, the user-based context being generated based on a user profile of a first user of the first display device, a user credential of the first user, and biometric data from the first user, the biometric data including at least one of a heart rate, a blood pressure, or brain activity, the ambient-based context indicating at least one of a geographic location of the display device, an orientation and a position of the first display device, an ambient pressure, an ambient humidity level, or an ambient light level.

7. The display device of claim 1, wherein the first collaboration configuration includes allocation instructions of operations and tasks from the first AR application and the second AR application between the first display device and the second display device.

8. The display device of claim 1, further comprising:

a display; and a plurality of sensors including a first set of sensors configured to measure first sensor data related to a user of the HMD, and a second set of sensors configured to measure second sensor data related to the HMD, wherein the operations further comprise:

determining a third context including a user-based context based on the first set of sensors, determining a fourth context including an ambient-based context based on the second set of sensors, and generating AR content based on the third context and the fourth context, the first AR application being configured to display the AR content in the display.

9. The display device of claim 8, wherein the operations further comprises:

modifying the AR content based on the first collaboration configuration; and causing a display of the modified AR content in the display of the first display device.

10. The display device of claim 8, wherein the operations further comprise:

determining a first authorization level of the first user based on the third context and the fourth context; and determining a second authorization level of a second user of the second display device based on a fifth context including a user-based context of the second user and a sixth context including an ambient-based context of the second display device, wherein the first and second collaboration configurations are based on the first authorization level of the first user and the second authorization level of the second user.

11. A method comprising:

determining a first device configuration of a first display device and a first context of a first AR application operating on the first display device;

connecting to a second display device;

determining a second device configuration of the second display device and a second context of a second AR application operating on the second display device;

generating a first collaboration configuration for the first display device and a second collaboration configuration for the second display device, the first and second collaboration configurations being generated based on the first device configuration, the first context, the second device configuration, and the second context, the second display device being configured to modify an operation of the second AR application based on the second collaboration configuration; and modifying an operation of the first AR application in the first display device based on the first collaboration configuration.

12. The method of claim 11, further comprising:

identifying a common process executed by the first and second display devices based on a common operation identified in the first and second configurations and in the first and second contexts;

determining that the first display device is configured to perform the common process more efficiently than the second display device;

assigning the common process to the first display device in the first collaboration configuration; and removing the common process from the second display device in the second collaboration configuration.

13. The method of claim 11, wherein the modifying of the operation of the first AR application in the first display device comprises:
   disabling a first display of the first display device; and
   causing a second display of the second display device to display content from the first AR application using the second collaboration configuration on the second AR application of the second display device.

14. The method of claim 11, further comprising:
   determining that a first task of a first user of the first display device and a second task of a second user of the second display device are part of a general workflow;
   generating first content and a first user interface for the first user of the first display device based on the first task, the first collaboration configuration including the first content and the first user interface; and
   generating a second content and a second user interface for the second user of the first display device based on the second task, the second collaboration configuration including the second content and the second user interface.

15. The method of claim 11, wherein the first configuration includes hardware and software specifications of the first display device, and hardware and software resource capacities and availabilities.

16. The method of claim 11, wherein the first context includes user-based context and ambient-based context of the first display device,
   the user-based context being generated based on a user profile of a first user of the first display device, a user credential of the first user, and biometric data from the first user, the biometric data including at least one of a heart rate, a blood pressure, or brain activity,
   the ambient-based context indicating at least one of a geographic location of the display device, an orientation and a position of the first display device, an ambient pressure, an ambient humidity level, or an ambient light level.

17. The method of claim 11, wherein the first collaboration configuration includes allocation instructions of operations and tasks from the first AR application and the second AR application between the first display device and the second display device.

18. The method of claim 11, wherein the first display device comprises a display, and a plurality of sensors including a first set of sensors configured to measure first sensor data related to a user of the HMD, and a second set of sensors configured to measure second sensor data related to the HMD,
   wherein the method further comprises:
   determining a third context including a user-based context based on the first set of sensors,
   determining a fourth context including an ambient-based context based on the second set of sensors,
   generating AR content based on the third context and the fourth context, the first AR application being configured to display the AR content in the display,
   modifying the AR content based on the first collaboration configuration; and
   causing a display of the modified AR content in the display of the first display device.

19. The method of claim 18, further comprising:
   determining a first authorization level of the first user based on the third context and the fourth context; and
   determining a second authorization level of a second user of the second display device based on a fifth context including a user-based context of the second user and a sixth context including an ambient-based context of the second display device,
   wherein the first and second collaboration configurations are based on the first authorization level of the first user and the second authorization level of the second user.

20. A non-transitory machine-readable medium comprising instructions that, when executed by one or more processors of a machine, cause the machine to perform operations comprising:
   determining a first device configuration of a first display device and a first context of a first AR application operating on the first display device;
   connecting to a second display device;
   determining a second device configuration of the second display device and a second context of a second AR application operating on the second display device;
   generating a first collaboration configuration for the first display device and a second collaboration configuration for the second display device, the first and second collaboration configurations being generated based on the first device configuration, the first context, the second device configuration, and the second context, the second display device being configured to modify an operation of the second AR application based on the second collaboration configuration; and
   modifying an operation of the first AR application in the first display device based on the first collaboration configuration.

* * * * *

UNITED STATES PATENT AND TRADEMARK OFFICE
CERTIFICATE OF CORRECTION

PATENT NO. : 9,865,093 B1  
APPLICATION NO. : 15/199570  
DATED : January 9, 2018  
INVENTOR(S) : Brian Mullins Page 1 of 1

It is certified that error appears in the above-identified patent and that said Letters Patent is hereby corrected as shown below:

On the Title Page

In item (22), in "Filed", in Column 1, Line 1, after "2016", insert --¶(65) Prior Publication Data US 2018/0005442 A1 Jan. 4, 2018-- therefor Signed and Sealed this
Twenty-eighth Day of May, 2019

Andrei Iancu
*Director of the United States Patent and Trademark Office*